United States Patent
Wu et al.

(10) Patent No.: US 8,774,011 B2
(45) Date of Patent: Jul. 8, 2014

(54) SYSTEM, APPARATUS AND METHOD FOR MAKING STATISTICS ON POINT TO POINT PROTOCOL NEGOTIATION STATE IN WIRELESS SYSTEM

(75) Inventors: Wenhua Wu, Shenzhen (CN); Guilu Han, Shenzhen (CN); Laiguo Zhai, Shenzhen (CN); Dongjian Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 185 days.

(21) Appl. No.: 13/258,418

(22) PCT Filed: Jun. 11, 2010

(86) PCT No.: PCT/CN2010/073853
§ 371 (c)(1),
(2), (4) Date: May 16, 2012

(87) PCT Pub. No.: WO2010/148967
PCT Pub. Date: Dec. 29, 2010

(65) Prior Publication Data
US 2012/0224489 A1    Sep. 6, 2012

(30) Foreign Application Priority Data

Nov. 19, 2009 (CN) .......................... 2009 1 0109762

(51) Int. Cl.
| | |
|---|---|
| *H04L 12/26* | (2006.01) |
| *H04W 60/00* | (2009.01) |
| *H04W 24/00* | (2009.01) |
| *H04W 28/04* | (2009.01) |
| *H04W 28/18* | (2009.01) |
| *H04W 88/12* | (2009.01) |
| *H04W 80/02* | (2009.01) |

(52) U.S. Cl.
CPC .............. *H04W 60/00* (2013.01); *H04W 24/00* (2013.01); *H04W 28/04* (2013.01); *H04W 28/18* (2013.01); *H04W 88/12* (2013.01); *H04W 80/02* (2013.01)
USPC ........... 370/242; 370/230; 370/235; 370/252; 370/328

(58) Field of Classification Search
CPC ....................................................... H04L 69/24
USPC .............. 370/230, 230.1, 235, 242, 252, 328, 370/338, 389, 522
See application file for complete search history.

(56) References Cited

U.S. PATENT DOCUMENTS

| | | | |
|---|---|---|---|
| 6,515,989 B1 * | 2/2003 | Ronneke ....................... | 370/389 |
| 6,628,671 B1 * | 9/2003 | Dynarski et al. .............. | 370/469 |

(Continued)

FOREIGN PATENT DOCUMENTS

| | | |
|---|---|---|
| CN | 1653773 A | 8/2005 |
| CN | 1713631 A | 12/2005 |
| CN | 1741662 A | 3/2006 |

OTHER PUBLICATIONS

International Search Report in international application No. PCT/CN2010/073853, mailed on Sep. 23, 2010.

(Continued)

*Primary Examiner* — Andrew Lai
*Assistant Examiner* — Andrew C Lee
(74) *Attorney, Agent, or Firm* — Oppedahl Patent Law Firm LLC

(57) ABSTRACT

Disclosed are a system, apparatus, and method for making statistics on Point to Point Protocol (PPP) negotiation state in a wireless system. The system includes: at least one user terminal; a packet data serving node communicating with the user terminal via PPP; a base station controller; and a call detail information recorder; wherein the base station controller, communicatively connected to the user terminal, captures a PPP negotiation packet of the user terminal, analyzes a PPP negotiation flow in the PPP negotiation packet, and sends an analysis result to the call detail information recorder; and the call detail information recorder, communicatively connected to the base station controller, collects data of various PPP negotiation states in the wireless system according to the analysis result. The disclosure conveniently counts PPP negotiation failures caused by the wireless system, thereby accurately reflecting performance of the whole wireless packet data system.

22 Claims, 3 Drawing Sheets

(56) References Cited

U.S. PATENT DOCUMENTS

| | | | |
|---|---|---|---|
| 6,973,088 B2 | 12/2005 | Kuzhiyil | |
| 7,009,950 B1* | 3/2006 | Hirata et al. | 370/331 |
| 7,054,291 B2* | 5/2006 | Balazinski et al. | 370/331 |
| 7,149,224 B1* | 12/2006 | Krishnamurthy | 370/401 |
| 7,292,531 B1* | 11/2007 | Hill | 370/230.1 |
| 7,746,852 B2* | 6/2010 | Teraoka et al. | 370/389 |
| 2002/0105911 A1* | 8/2002 | Pruthi et al. | 370/241 |
| 2003/0026255 A1* | 2/2003 | Poeluev et al. | 370/392 |
| 2004/0062254 A1 | 4/2004 | Kuzhiyil | |
| 2004/0148427 A1* | 7/2004 | Nakhjiri et al. | 709/237 |
| 2005/0198277 A1* | 9/2005 | Wada et al. | 709/224 |
| 2005/0266842 A1* | 12/2005 | Nasielski et al. | 455/432.1 |
| 2006/0015576 A1* | 1/2006 | Seo et al. | 709/219 |
| 2006/0062228 A1* | 3/2006 | Ota et al. | 370/401 |
| 2007/0245405 A1* | 10/2007 | Cao | 726/3 |
| 2007/0280123 A1* | 12/2007 | Atkins et al. | 370/252 |
| 2008/0004035 A1* | 1/2008 | Atkins et al. | 455/454 |
| 2008/0080369 A1* | 4/2008 | Sumioka et al. | 370/229 |
| 2009/0327113 A1* | 12/2009 | Lee et al. | 705/34 |
| 2010/0070627 A1* | 3/2010 | Miyazaki et al. | 709/224 |

OTHER PUBLICATIONS

English Translation of the Written Opinion of the International Search Authority in international application No. PCT/CN2010/073853, mailed on Sep. 23, 2010.

* cited by examiner

SYSTEM, APPARATUS AND METHOD FOR MAKING STATISTICS ON POINT TO POINT PROTOCOL NEGOTIATION STATE IN WIRELESS SYSTEM

TECHNICAL FIELD

The disclosure relates to a technology of making statistics on Point to Point Protocol (PPP) negotiation state, in particular to a system, apparatus and method for making statistics on PPP negotiation state in a wireless system.

BACKGROUND

In wireless packet data service, Point to Point Protocol (PPP) is an essential protocol, which exists in the protocol stack level of a user terminal and a Packet Data Serving Node (PDSN), and is used for creating a unique point to point link between the user terminal and the PDSN to achieve peer-to-peer communication.

A PPP negotiation success rate is an important index that reflects performance of the whole wireless packet data system, and is an important parameter for system performance optimization. At present, making statistics on the PPP negotiation is success rate index is performed at a PDSN side, as the PDSN side is unable to make statistics on a PPP negotiation failure caused by a wireless system, thereby making statistics on the PPP negotiation success rate index in the wireless system and number of times of PPP negotiation failure caused by the wireless system comprehensively and accurately cannot be realized, as a result, it cannot be accurately reflected whether the performance of the whole wireless packet data system is good or poor.

SUMMARY

One of the objects of the disclosure is to provide a system, apparatus and method for making statistics on PPP negotiation state in a wireless system, to make statistics on a reason for a PPP negotiation failure caused by a wireless system, so that making statistics on various state data of a PPP negotiation in the wireless system comprehensively and accurately can be realized.

The technical solution of the disclosure is as follows.

The disclosure provides a system for making statistics on Point to Point Protocol (PPP) negotiation state in a wireless system, which includes: at least one user terminal and a packet data serving node which realizes a communication connection with the user terminal via a PPP, wherein the system further comprises: a base station controller and a call detail information recorder;

the base station controller is communicatively connected to the user terminal, and is configured to capture a PPP negotiation packet of the user terminal, analyze each PPP negotiation flow in the PPP negotiation packet and send an analysis result to the call detail information recorder; and the call detail information recorder is communicatively connected to the base station controller, and is configured to make statistics on various state data of a PPP negotiation according to the analysis result.

In the system, the various state data of the PPP negotiation may include: number of times of PPP negotiation success, number of times of PPP negotiation failure, a PPP negotiation success rate, a PPP negotiation failure rate and a PPP negotiation duration.

In the system, the base station controller may further be configured to fragment and reassemble a captured PPP negotiation packet; and perform PPP negotiation message escape on a fragmented and reassembled PPP negotiation packet, and perform frame check; and then decode the fragmented and reassembled PPP negotiation packet to obtain information of a type of the PPP negotiation packet.

The disclosure further provides an apparatus for making statistics on PPP negotiation state in a wireless system, which includes: a base station controller module and a call detail information recorder module;

wherein the base station controller module is configured to capture a PPP negotiation packet of a user terminal, analyze a PPP negotiation flow in the PPP negotiation packet, and send an analysis result to the call detail information recorder module; and the call detail information recorder module is configured to make statistics on various state data of a PPP negotiation according to the analysis result.

In the apparatus, the various state data of the PPP negotiation may include: number of times of PPP negotiation success, number of times of PPP negotiation failure, a PPP negotiation success rate, a PPP negotiation failure rate and a PPP negotiation duration.

In the apparatus, the base station controller module may be further configured to fragment and reassemble a captured PPP negotiation packet; perform PPP negotiation message escape and frame check on a reassembled PPP negotiation packet; and then decode the reassembled PPP negotiation packet to obtain information of a type of the PPP negotiation packet.

The disclosure further provides a method for making statistics on PPP negotiation state in a wireless system, which includes the following steps:

a base station controller captures a PPP negotiation packet of a user terminal;

the base station controller analyzes each PPP negotiation flow in the PPP negotiation packet, and sends an analysis result to a call detail information recorder; and the call detail information recorder makes statistics on various state data of a PPP negotiation according to the analysis result.

In the method, the various state data of the PPP negotiation may include: number of times of PPP negotiation success, number of times of PPP negotiation failure, a PPP negotiation success rate, a PPP negotiation failure rate and a PPP negotiation duration.

In the method, the step that the base station controller captures the PPP negotiation packet of the user terminal may further include the following steps:

the base station controller fragments and reassembles a captured PPP negotiation packet; and the base station controller decodes a fragmented and reassembled PPP negotiation packet to obtain information of a type of the PPP negotiation packet.

Before the base station controller analyzes the PPP negotiation flow in the PPP negotiation packet, the method may further include:

the base station controller performs PPP negotiation message escape on the fragmented and reassembled PPP negotiation packet, and performs a frame check.

By the system, apparatus and method for making statistics on PPP negotiation state in a wireless system, the base station controller captures the PPP negotiation packet of the user terminal, analyzes each PPP negotiation flow in the PPP negotiation packet, and sends an analysis result to the call detail information recorder; and the call detail information recorder makes statistics on various state data of a PPP negotiation according to the analysis result; therefore the disclosure effectively overcome the defect existing in the prior art, and making statistics on a reason for PPP negotiation failure caused by the wireless system is realized, such that making statistics on various state data of the PPP negotiation in the wireless system comprehensively and accurately can be realized, that is, whether the performance of the whole wireless packet data system is good or poor can be accurately reflected.

DETAILED DESCRIPTION

All preferred embodiments of the disclosure will be described in details with reference to the drawings hereinafter.

In order to make statistics on a reason for PPP negotiation failure caused by a wireless system to finally comprehensively and accurately make statistics on various state data of a PPP negotiation in the wireless system, a system for making statistics on PPP negotiation state provided by the disclosure is obtained by adding the following components to the existing system: a base station controller configured to capture a PPP negotiation packet and analyze each PPP negotiation flow in the PPP negotiation packet; and a call detail information recorder configured to summarize an analysis result and make statistics on various state data of a PPP negotiation.

Figure 1:
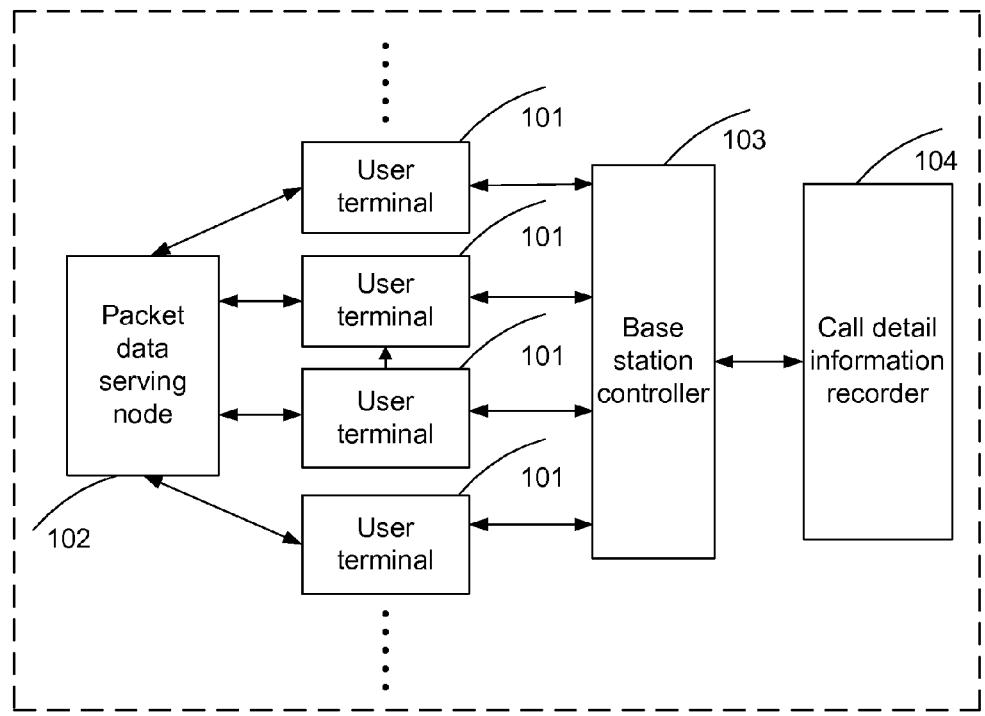
FIG. 1 shows a schematic diagram illustrating structure of a system for making statistics on PPP negotiation state in a wireless system according to an embodiment of the disclosure.

As shown in FIG. 1, a system in the disclosure includes: a user terminal 101, a packet data serving node 102, a base station controller 103 and a call detail information recorder 104;

wherein there may be one or more user terminals 101;

a point to point communication connection is established between the packet data serving node 102 and the user terminal 101 through a PPP;

the base station controller 103 is communicatively connected with each user terminal 101, and is configured to filter a data message inside the system to capture a PPP negotiation packet of each user terminal 101, fragment and reassemble the captured PPP negotiation packet to form a complete PPP negotiation packet, then perform PPP message escape and frame check on the fragmented and reassembled PPP negotiation packet, and decode the fragmented and reassembled PPP negotiation packet to extract information of the type of the PPP negotiation packet; and the base station controller 103 further analyzes each PPP negotiation flow in the PPP negotiation packet after decoding the PPP negotiation packet, records an analysis result of each PPP negotiation flow, and then send the analysis result to the call detail information recorder 104, so as to facilitate the call detail information recorder 104 to summarize and record the analysis result; and the call detail information recorder 104 is communicatively connected with the base station controller 103, and is configured to summarize and record the analysis results of all PPP negotiation flows sent from the base station controller 103, perform comprehensive analysis on data of the summarized result through its own analysis software, classify reasons for PPP negotiation failure, calculate a rate of each failure reason, and finally make statistics on various state data of a PPP negotiation in a wireless system; the analysis process of the analysis software is as follows: making statistics on various state data of the PPP negotiation in the wireless system by recording the result of each PPP negotiation, wherein the various state data of the PPP negotiation include: number of times of PPP negotiation success, number of times of PPP negotiation failure, a PPP negotiation success rate, a PPP negotiation failure rate and a PPP negotiation duration, and the PPP system negotiation success rate further includes a total PPP negotiation rate of a system, a PPP negotiation success rate of each user terminal, a PPP negotiation success rate of each cell and the like; if statistics are made on the number of times of various failure reasons for the PPP negotiation result, the following formulas can be used:

$$PPP \text{ negotiation success rate} = \frac{\text{number of times of } PPP \text{ negotiation success}}{\text{total number of times of } PPP \text{ negotiation}}, \text{ and}$$

$$\text{each type of } PPP \text{ negotiation failure rate} = \frac{\text{number of times of each type of } PPP \text{ negotiation failure}}{\text{total number of times of } PPP \text{ negotiation}}$$

to calculate the PPP negotiation success rate and each type of the PPP negotiation failure rate. Wherein the analysis software may be a Call Detail Trace system.

The system for making statistics on PPP negotiation state in a wireless system provided by the disclosure is obtained by adding the following components to the existing system: a base station controller 103 configured to capture a PPP negotiation packet of each user terminal 101 in the system and analyze each PPP negotiation flow in the PPP negotiation packet; and a call detail information recorder 104 configured to summarize an analysis result of the PPP negotiation flow to make statistics on various state data of a PPP negotiation in a wireless system, the disclosure solves the technical defect that statistics cannot be made on the PPP negotiation success or failure caused by the wireless system in the prior art, and making statistics on various state data of the PPP negotiation in the wireless system comprehensively and accurately can be realized.

Figure 2:
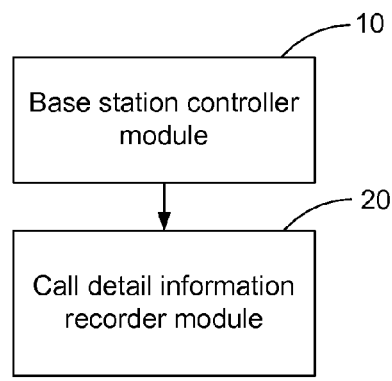
FIG. 2 shows a schematic diagram illustrating structure of an apparatus for making statistics on PPP negotiation state in a wireless system according to an embodiment of the disclosure.

An apparatus for making statistics on PPP negotiation state in a wireless system provided by the disclosure is mainly configured to capture a PPP negotiation packet of a user terminal, analyze a PPP negotiation flow in the PPP negotiation packet and make statistics on various state data of a PPP negotiation in the wireless system according to an analysis result; as shown in FIG. 2, the apparatus includes: a base station controller module 10 and a call detail information recorder module 20;

wherein the base station controller module 10 is configured to filter a data message transmitted inside the system, extract a PPP negotiation packet of a user terminal from the data message, fragment and reassemble the PPP negotiation packet, extract a complete PPP negotiation packet, then perform message escape and frame check on the reassembled PPP negotiation packet, and decode the reassembled PPP negotiation packet to obtain information of the type of the PPP negotiation packet; after performing these preceding processing on the PPP negotiation packet, the base station controller module 10 analyzes each PPP negotiation flow in the PPP negotiation packet, and sends an analysis result to the call detail information recorder module 20 after completing analysis;

the call detail information recorder module 20 is configured to receive the analysis result, summarize and record the analysis result, then perform comprehensive analysis on the analysis result through its own analysis software, classify and make statistics on a reason for failure of a PPP negotiation packet, calculate rates of various failure reasons, i.e., make statistics on various state data of a PPP negotiation in the wireless system;

wherein the various state data of the PPP negotiation include: number of times of PPP negotiation success, number of times of PPP negotiation failure, a PPP negotiation success rate, a PPP negotiation failure rate and a PPP negotiation duration; and the PPP system negotiation success rate further includes a total PPP negotiation rate of the system, a PPP negotiation success rate of each user terminal, a PPP negotiation success rate of each cell and the like.

The apparatus provided by the disclosure can make statistics on various state data of a PPP negotiation in a wireless system through the call detail information recorder module 20 according to a result of analyzing a PPP negotiation flow in a PPP negotiation packet performed by the base station controller module 10, thus solves the technical defect that statistics cannot be made on the PPP negotiation success or failure caused by the wireless system in the prior art; furthermore, whether performance of a wireless packet data system is good or poor can be learned accurately through making statistics on the various state data of the PPP negotiation by the apparatus.

Figure 3:
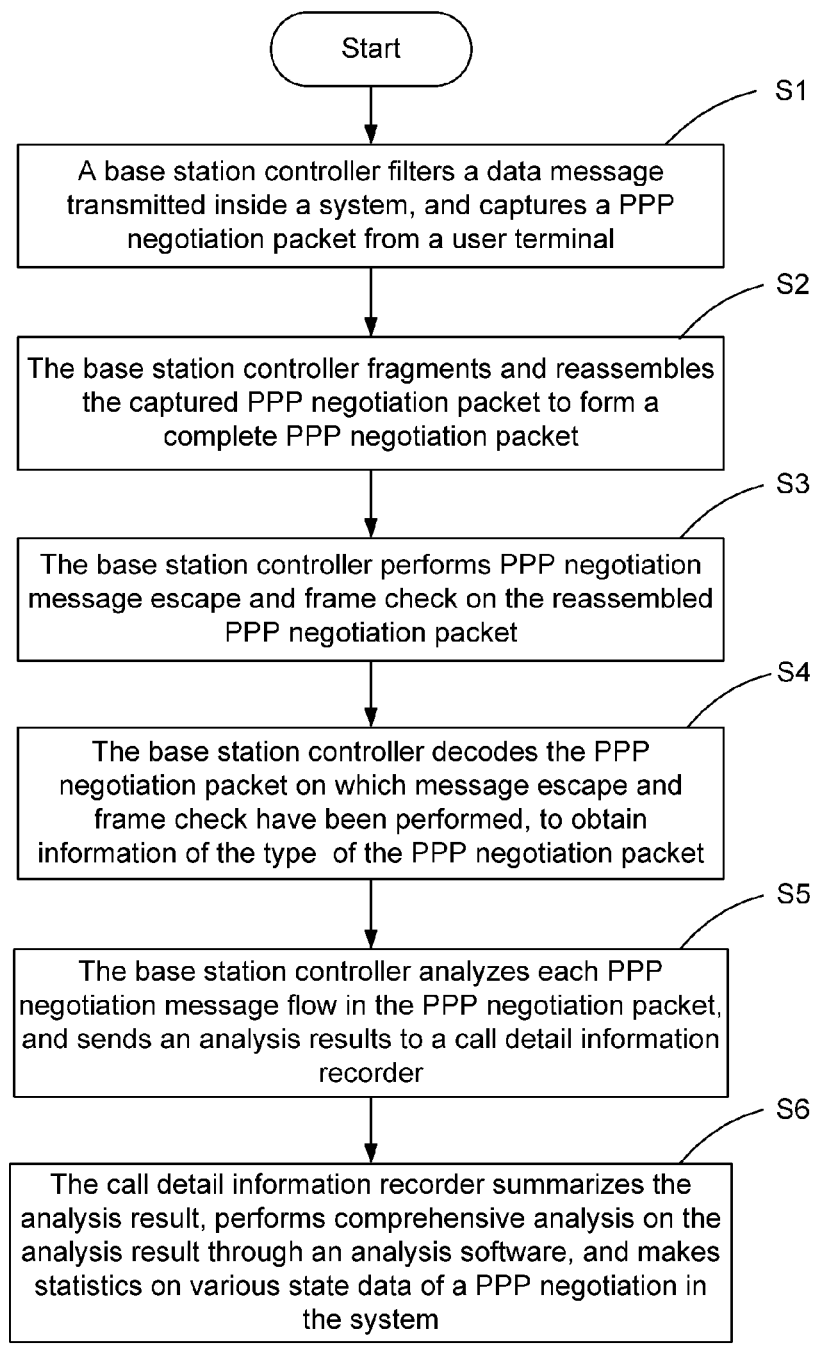
FIG. 3 shows a flowchart of an embodiment of a method for making statistics on PPP negotiation state in a wireless system in the disclosure.

In a method for making statistics on PPP negotiation state in a wireless system provided by the disclosure, when a data message is transmitted inside a system, the system filters all data messages through the base station controller, captures a PPP negotiation packet from a user terminal, fragments, reassembles and decodes the PPP negotiation packet, then analyzes each PPP negotiation flow in the PPP negotiation is packet, and sends an analysis result to a call detail information recorder; and then the call detail information recorder summaries the analysis result, and makes statistics on various state data of a PPP negotiation in the wireless system; as shown in FIG. 3, an embodiment of the method includes the following specific steps:

step S1: a base station controller filters a data message transmitted inside a system, and captures a PPP negotiation packet from a user terminal;

step S2: the base station controller fragments and reassembles the captured PPP negotiation packet to form a complete PPP negotiation packet, and extracts the PPP negotiation packet;

step S3: the base station controller performs PPP negotiation message escape and frame check on the fragmented and reassembled PPP negotiation packet;

step S4: the base station controller decodes the PPP negotiation packet on which PPP negotiation message escape and frame check have been performed, to obtain information of the type of the PPP negotiation packet, such as Code field;

step S5: the base station controller analyzes each PPP negotiation flow in the PPP negotiation packet by the state machine principle, and sends an analysis result to a call detail information recorder;

the analysis result includes: number of times of PPP negotiation success, various reasons for PPP negotiation failure, a negotiation duration and other information, and the PPP negotiation failure may be caused by a wireless system, and may also be caused by a packet data serving node; and step S6: after receiving the analysis result, the call detail information recorder summarizes and records the analysis result, performs comprehensive analysis on the analysis result through its own analysis software, summarizes various reasons for PPP negotiation failure, calculates rates of various failure reasons, and finally makes statistics on various state data of a PPP negotiation in the system.

In the system for making statistics on PPP negotiation state in a wireless system, various state data of a PPP negotiation include: number of times of PPP negotiation success, number of times of PPP negotiation failure, a PPP negotiation success rate, a PPP negotiation failure rate and a PPP negotiation duration; and the PPP system negotiation success rate further includes a total PPP negotiation rate of a system, a PPP negotiation success rate of each user terminal, a PPP negotiation success rate of each cell and the like.

Figure 4:
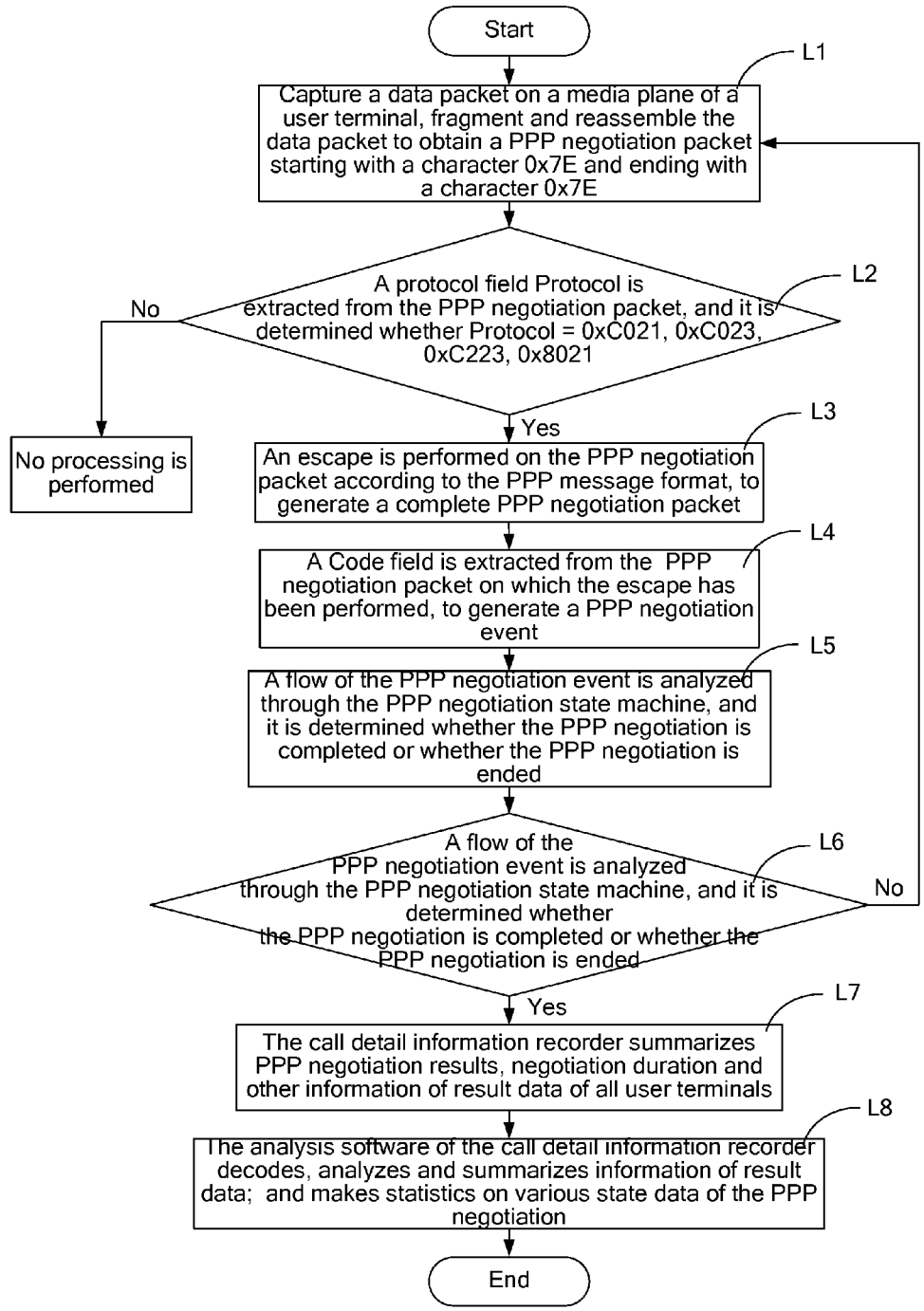
FIG. 4 shows a flowchart of another embodiment of the method for making statistics on PPP negotiation state in a wireless system in the disclosure.

Another embodiment of the method for making statistics on PPP negotiation state in a wireless system, as shown in FIG. 4, includes the following specific steps:

step L1: after a user terminal establishes a call, a base station controller captures a data packet on a media plane of the user terminal, fragments and reassembles the data packet to obtain a reassembled packet starting with a character 0x7E and ending with a character 0x7E, wherein the reassembled packet is a complete PPP packet;

step L2: a protocol field Protocol is extracted from the reassembled packet, and it is determined whether the field is Protocol=0xC021, 0xC023, 0xC223, 0x8021, if yes, it is indicated that the reassembled packet is a PPP negotiation packet, and then step L3 is executed; otherwise, no processing is performed;

step L3: an escape is performed on the PPP negotiation packet according to the PPP message format, to generate a complete PPP negotiation packet, wherein the format of the PPP message is shown in Table 1;

TABLE 1

| Mark | Address | Control | Protocol | Data | CRC | Mark |
|------|---------|---------|----------|------|-----|------|
| 0x7E | 0xFF    | 0x03    | 8/16 bits |     |     | 0x7E | step L4: a Code field is extracted from the PPP negotiation packet on which the escape has been performed to generate a PPP negotiation event;

step L5: a flow of the PPP negotiation event is analyzed through the PPP negotiation state machine, it is determined whether the PPP negotiation is completed (an IPCP Configure Ack event is received forward and backward) or whether the PPP negotiation is ended (a forward or backward LCP Configure Terminate event or IPCP Configure Terminate event is received), if yes, execute step L6; otherwise, execute step L1;

wherein the PPP negotiation event includes an LCP Configure Request, LCP Configure Ack and the like;

step L6: the base station controller obtains the final negotiation state of the PPP negotiation state machine, a PPP negotiation terminate event, a negotiation duration and other information, sends these information to a call detail information recorder, and then step L7 is executed;

at the moment, a flow at the base station controller side is ended, in the following steps, the call detail information recorder analyzes these information and makes statistics on various state data of a PPP negotiation in a wireless system;

step L7: the call detail information recorder summarizes PPP negotiation results, negotiation duration and other information of all user terminals, and records data of summarized result, and then step L8 is executed; and step L8: an analysis software of the call detail information recorder decodes, analyzes and summarizes data of the recorded and summarized result; and makes statistics on various state data of the PPP negotiation, including: number of times of PPP negotiation success, number of times of each type of PPP negotiation failure and average PPP negotiation duration, in order to make statistics on a PPP negotiation success rate of the wireless system, a PPP negotiation success rate of each user terminal, a PPP negotiation success rate of each cell and the like.

By the method for making statistics on PPP negotiation state in a wireless system provided by the disclosure, a base station controller is utilized to capture a PPP negotiation packet, fragment, reassemble and decode the PPP negotiation packet to extract information of the type of the PPP negotiation packet, then analyze each PPP negotiation flow in the PPP negotiation packet, and send an analysis result to a call detail information recorder, and then the call detail information recorder summaries the analysis result and makes statistics on various state data of a PPP negotiation, therefore the defect existing in the prior art is effectively overcome, and making statistics on various state data of the PPP negotiation in the whole wireless system can be realized, such that whether performance of the whole wireless packet data system is good or poor can be reflected accurately.

A call detail information recorder added in the system provided by the disclosure can also further analyze PPP negotiation situation of the whole wireless system, for example, it can analyze a TopN user terminal and a TopN failure reason, which will not be described too much herein.

The above are only preferred embodiments of the disclosure and are not intended to limit the protection scope of the disclosure, and any modifications, equivalent replacements or improvements made within the spirit and principle of the disclosure shall be included within the protection scope of the disclosure.

The invention claimed is:

1. A system for acquiring statistics on Point to Point Protocol (PPP) negotiation states in a wireless system, comprising: at least one user terminal and a packet data serving node (PDSN) communicatively connected to the user terminal via a PPP, and further comprising: a base station controller and a call detail information recorder; wherein the base station controller is communicatively connected to the at least one user terminal, and is configured to capture a PPP negotiation packet of the user terminal, analyze a PPP negotiation flow in the PPP negotiation packet using a PPP negotiation state machine, and send the call detail information recorder an analysis result comprising a cause of an unsuccessful PPP negotiation, wherein the cause of an unsuccessful PPP negotiation comprises an issue in the wireless system or an issue at the PDSN; and the call detail information recorder is communicatively connected to the base station controller, and is configured to acquire, according to the analysis result, statistical data on various PPP negotiation states in the wireless system, wherein the statistical data on various PPP negotiation states comprise a rate of unsuccessful PPP negotiations caused by the wireless system.

2. The system according to claim 1, wherein the statistical data on various PPP negotiation states further comprise: a number of successful PPP negotiations, a number of unsuccessful PPP negotiations, a rate of successful PPP negotiations, and a PPP negotiation duration.

3. The system according to claim 2, wherein the base station controller is further configured to fragment and reassemble a captured PPP negotiation packet.

4. The system according to claim 3, wherein the base station controller is further configured to decode a fragmented and reassembled PPP negotiation packet to obtain information of a type of the PPP negotiation packet.

5. The system according to claim 4, wherein the base station controller is further configured to perform PPP negotiation message escape on the fragmented and reassembled PPP negotiation packet, and perform frame check.

6. The system according to claim 1, wherein the base station controller is further configured to fragment and reassemble a captured PPP negotiation packet.

7. The system according to claim 6, wherein the base station controller is further configured to decode a fragmented and reassembled PPP negotiation packet to obtain information of a type of the PPP negotiation packet.

8. The system according to claim 7, wherein the base station controller is further configured to perform PPP negotiation message escape on the fragmented and reassembled PPP negotiation packet, and perform frame check.

9. An apparatus for acquiring statistics on Point to Point Protocol (PPP) negotiation states in a wireless system, comprising: a base station controller module and a call detail information recorder module; wherein the base station controller module is configured to capture a PPP negotiation packet of a user terminal, analyze a PPP negotiation flow in the PPP negotiation packet using a PPP negotiation state machine, and send the call detail information recorder module an analysis result comprising a cause of an unsuccessful PPP negotiation, wherein the cause of an unsuccessful PPP negotiation comprises an issue in the wireless stem or an issue at the PDSN; and the call detail information recorder module is configured to acquire, according to the analysis result, statistical data on various PPP negotiation states in the wireless system, wherein the statistical data on various PPP negotiation states comprise a rate of unsuccessful PPP negotiations caused by the wireless system.

10. The apparatus according to claim 9, wherein the statistical data on various PPP negotiation states further comprise: a number of successful PPP negotiations, a number of unsuccessful PPP negotiations, a rate of successful PPP negotiations, and a PPP negotiation duration.

11. The apparatus according to claim 10, wherein the base station controller module is further configured to fragment and reassemble a captured PPP negotiation packet.

12. The apparatus according to claim 11, wherein the base station controller module is further configured to decode a fragmented and reassembled PPP negotiation packet to obtain information of a type of the PPP negotiation packet.

13. The apparatus according to claim 12, wherein the base station controller module is further configured to perform PPP negotiation message escape on the fragmented and reassembled PPP negotiation packet, and perform frame check.

14. The apparatus according to claim 9, wherein the base station controller module is further configured to fragment and reassemble a captured PPP negotiation packet.

15. The apparatus according to claim 14, wherein the base station controller module is further configured to decode a fragmented and reassembled PPP negotiation packet to obtain information of a type of the PPP negotiation packet.

16. The apparatus according to claim 15, wherein the base station controller module is further configured to perform PPP negotiation message escape on the fragmented and reassembled PPP negotiation packet, and perform frame check.

17. A method for acquiring statistics on PPP negotiation states in a wireless system, comprising:
    capturing a PPP negotiation packet of a user terminal;
    analyzing a PPP negotiation flow in the PPP negotiation packet using a PPP negotiation state machine to obtain an analysis result comprising a cause of an unsuccessful PPP negotiation, wherein the cause of an unsuccessful PPP negotiation comprises an issue in the wireless system or an issue at the PDSN; and
    acquiring, according to an analysis result, statistical data on various PPP negotiation states in the wireless system, wherein the statistical data on various PPP negotiation states comprise a rate of unsuccessful PPP negotiations caused by the wireless system.

18. The method according to claim 17, wherein the statistical data on various PPP negotiation states further comprise: a number of successful PPP negotiations, a number of unsuccessful PPP negotiations, a rate of successful PPP negotiations, and a PPP negotiation duration.

19. The method according to claim 18, wherein capturing the PPP negotiation packet of the user terminal further comprises:
    fragmenting and reassembling a captured PPP negotiation packet; and
    decoding a fragmented and reassembled PPP negotiation packet to obtain information of a type of the PPP negotiation packet.

20. The method according to claim 19, further comprising: before analyzing the PPP negotiation flow in the PPP negotiation packet,
    performing PPP negotiation message escape on the fragmented and reassembled PPP negotiation packet, and performing frame check.

21. The method according to claim 17, wherein capturing the PPP negotiation packet of the user terminal further comprises:
    fragmenting and reassembling a captured PPP negotiation packet; and
    decoding a fragmented and reassembled PPP negotiation packet to obtain information of a type of the PPP negotiation packet.

22. The method according to claim 21, further comprising: before analyzing the PPP negotiation flow in the PPP negotiation packet,
    performing PPP negotiation message escape on the fragmented and reassembled PPP negotiation packet, and performing frame check.

* * * * *